United States Patent Office 3,778,516
Patented Dec. 11, 1973

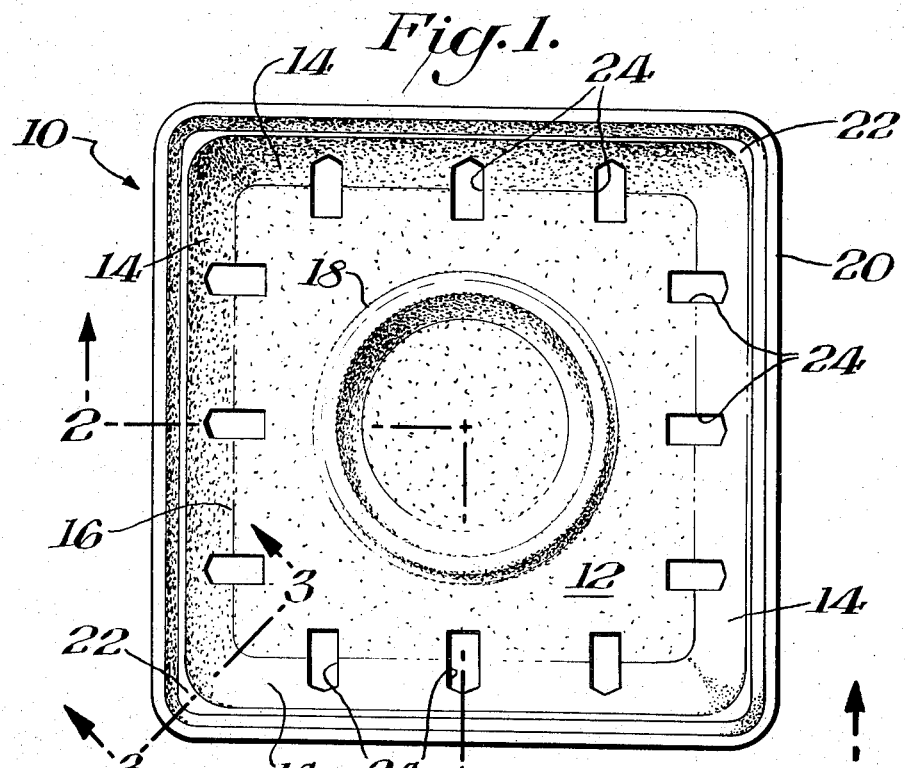
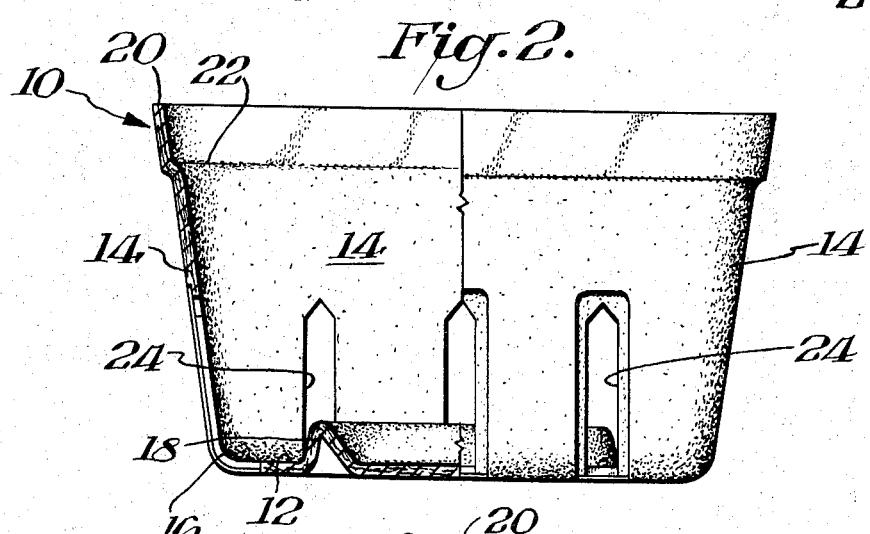
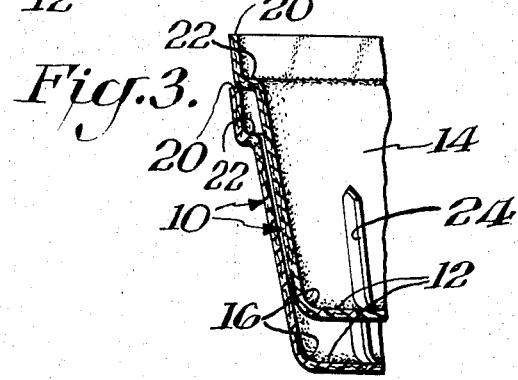

3,778,516
FRUIT CONTAINER
William J. Cornelius, Hendersonville, N.C., assignor to Keyes Fibre Company, Waterville, Maine
Filed Apr. 21, 1972, Ser. No. 246,386
Int. Cl. B65d 1/00, 85/34
U.S. Cl. 426—119                                             3 Claims

ABSTRACT OF THE DISCLOSURE

Fruit container comprises bottom wall with upwardly and outwardly flaring side wall connected around periphery of bottom wall. Locating structure in center region of bottom wall extends upwardly therefrom and is arranged to support and locate single fruit layer in container at center of bottom wall. Locating structure is sufficiently spaced from periphery of bottom wall so that second layer of four fruit may be positioned in container above single fruit layer with each fruit of second layer supported by lower single fruit and side wall of container.

BACKGROUND OF THE INVENTION

The present invention relates to a container, and more particularly to a container for fruit, vegetables and the like.

Prior to the present invention numerous containers have been proposed for packaging fruit and vegetables. Such containers are shown, for example, in Hatch Pat. 2,738,-914, granted Mar. 20, 1956 and Kennedy Pat. 1,701,238, granted Feb. 5, 1929. However, with the heretofore proposed containers it is extremely difficult and time consuming to arrange fruit in an orderly manner within the container. Many small containers require the fruit packaged therein to be arranged in a particular manner. Often, it is desired to arrange the fruit in three layers with a single fruit in the lowermost and uppermost layers and four individual fruit in the middle layer. This packaging orientation requires that the single fruit in the lowermost layer be centrally located at the bottom of the container. With the prior art devices, locating the lowermost fruit in the center of the container is a hit and miss proposition, and often the lowermost fruit is dislodged from its central location after being manually or mechanically placed there. With the lowermost fruit mislocated, one of the fruit from the second applied layer usually drops to the bottom of the container thus resulting in at least two fruit in the lowermost layer. With two fruit in the lowermost layer, one extra fruit is included in the completed package since there is still space for a second layer of four fruit. In addition to the non-uniform count in the package, the symmetry of the package is destroyed since the fruit in the second layer is not at a common level.

SUMMARY OF THE INVENTION

The container of the present invention overcomes the above described problems experienced in packaging fruit for retail display and sale. With the present container, a package is easily produced containing a single fruit forming a lower layer located centrally against the container bottom, a second layer of four symmetrically spaced fruit resting upon the single lower fruit with one fruit occupying each corner of the container and resting against the container side wall, and a third layer comprising a single fruit resting in the central cavity formed by the four fruit of the second layer.

Accordingly, the primary object of the present invention is to provide a relatively inexpensive container constructed so that packaging of fruit therein in the manner described above is accomplished in a simple and efficient manner with little, if any, variation in the symmetry of the packaged fruit from one package to another.

In accordance with the present invention, a fruit container has a bottom wall with an upwardly and outwardly flaring side wall connected around the periphery of the bottom wall. Locating structure in the center region of the bottom wall extending upwardly therefrom is arranged to support and locate a single fruit layer in the container at the center of the bottom wall. The locating structure is sufficiently spaced from the periphery of the bottom wall so that a second layer of four fruit may be positioned in the container above the single fruit layer with each fruit of the second layer supported by the lower single fruit and the side wall of the container.

Preferably, the locating structure in the center region of the container bottom wall comprises a raised annular rib or ring. Also, the container bottom wall may be square, with a plurality of spaced apart vertically oriented slots at the lower portion of the side wall and partially extending into the bottom wall.

BRIEF DESCRIPTION OF THE DRAWING

Novel features and advantages of the present invention in addition to those mentioned above will become apparent to those skilled in the art from a reading of the following detailed description in conjunction with the accompanying drawing wherein:

FIG. 1 is a top plan view of the fruit container according to the present invention;

FIG. 2 is a cross sectional view taken along line 2—2 of FIG. 1; and

FIG. 3 is a fragmentary sectional view taken along line 3—3 of FIG. 1 illustrating a pair of containers in nested condition.

DETAILED DESCRIPTION OF THE INVENTION

Referring in more particularity to the drawing, the several figures illustrate a container 10 having a substantially uniform thickness throughout. The container is preferably formed of a material which is capable of being molded as a single unit, i.e. integrally molded. Although fiber pulp and the molding procedures associated therewith are particularly satisfactory for this purpose, other suitable materials may be used such as light, strong plastic which may be molded as a one piece unit between mating male and female dies or in other conventional dies. As described more fully below, the container 10 is particularly useful in packaging fruit, such as tomatoes, peaches and the like. A desired symmetry of the packaged fruit from one container to the next is easily and efficiently achieved with the container of the present invention.

The fruit container 10 comprises a bottom wall 12 with an upwardly and outwardly flaring side wall 14 connected around the periphery of the bottom wall at 16. As shown best in FIG. 1 the bottom wall 12 is square and the side wall 14 has four segments integrally connected together.

Locating structure 18 is provided in the center region of the bottom wall 12. This structure extends upwardly from the bottom wall, as best shown in FIG. 2, and is arranged to support and locate a single fruit in the container at the center of the bottom wall. Preferably, the locating structure 18 comprises a raised annular rib or ring. Specifically, the ring may have an inside diameter of approximately 1 9/16 inch with the width at the base of the ring being 5/16 inch. The height of the ring is also approximately 5/16 inch.

The side wall 14 terminates at its upper end in a peripheral rim 20. Also, in each of the four corners of the container a corner ledge 22 is provided and these ledges are spaced downwardly relative to the peripheral rim 20.

As best shown in FIG. 3, when two or more containers are nested, one within the other, the corner ledges of the uppermost container rest upon the peripheral rim of the lower container while the corresponding side walls of the nested containers are slightly spaced from each other. As is well known, the spacing of the side walls prevents any frictional engagement between them whereas the contact between the corner ledges of the uppermost container and the rim of the lower container is merely a support contact where the only force exerted is the force of gravity. There is therefore, no locking frictional engagement whatsoever between the nested containers.

A plurality of spaced apart vertically oriented slots 24 is provided at the lower portion of the side wall 14 and these slots partially extend into the bottom wall 12. The slots function as openings for ventilating currents which pass through the container and around the packaged fruit therein. The slots have the added purpose of permitting drainage of any liquid which might otherwise accumulate in the bottom of the container.

In operation, the container of the present invention is utilized to package fruit in an attractive manner for retail display and sale. Initially, a single fruit is centrally located against the container bottom and the locating ring 18 provides the means whereby the first fruit inserted into the container is centrally positioned. Once this is accomplished, four additional fruit are located in the container with one fruit occupying each corner thereof and resting against the container side wall 14 and the single lower fruit. The next step involves positioning a single fruit in the center cavity formed by the four fruit directly therebelow in the container. Such a configuration provides a symmetrically attractive display package containing a consistent number of fruit for consistent pricing purposes. The package may be overwrapped with a transparent film, if desired.

What is claimed is:

1. A fruit container comprising a bottom wall, an upwardly and outwardly flaring side wall connected around the periphery of the bottom wall, and locating means in the center region of the bottom wall extending upwardly therefrom arranged to support and locate a single fruit layer in the container at the center of the bottom wall, the locating means being sufficiently spaced from the periphery of the bottom wall whereby a second layer of four fruit may be positioned in the container above the single fruit layer with each fruit of the second layer supported by the lower single fruit and the side wall of the container, and wherein the bottom wall is square and the locating means comprises a raised annular rib in the form of a ring with a 1 9/16 inch inside diameter and a 5/16 inch base width.

2. A package comprising fruit and a container therefor including a bottom wall, an upwardly and outwardly flaring side wall connected around the periphery of the bottom wall, and locating means in the center region of the bottom wall sufficiently spaced from the periphery thereof and extending slightly upwardly therefrom arranged to support and locate a single fruit layer in the container at the center of the bottom wall, a single fruit layer supported by the locating means at the center of the bottom wall, and a second layer of four fruit positioned in the container above the lower single fruit layer with each fruit of the second layer supported by the lower single fruit and the side wall of the container.

3. A package as in claim 2 wherein the locating means comprises a raised annular rib.

References Cited
UNITED STATES PATENTS

| | | | |
|---|---|---|---|
| 1,595,356 | 8/1926 | Moseman | 229—2.5 UX |
| 2,007,523 | 7/1935 | Emery | 229—2.5 UX |
| 2,814,427 | 11/1957 | Emery | 229—2.5 |
| 3,104,044 | 9/1963 | Reifers | 229—2.5 |

DAVIS T. MOORHEAD, Primary Examiner

U.S. Cl. X.R.

206—46 F; 229—2.5